US011950191B2

(12) United States Patent
Zhang et al.

(10) Patent No.: US 11,950,191 B2
(45) Date of Patent: Apr. 2, 2024

(54) CONFIGURING CLIENT DEVICE REGULATION MODES FOR SIDELINK COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Yisheng Xue, San Diego, CA (US); Aleksandar Damnjanovic, Del Mar, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/313,972

(22) Filed: May 8, 2023

(65) Prior Publication Data
US 2023/0284153 A1 Sep. 7, 2023

Related U.S. Application Data

(62) Division of application No. 17/160,305, filed on Jan. 27, 2021, now Pat. No. 11,690,024.

(30) Foreign Application Priority Data

May 5, 2023 (IN) .............................. 202347032070

(51) Int. Cl.
*H04W 52/24* (2009.01)
*H04W 52/10* (2009.01)
(Continued)

(52) U.S. Cl.
CPC .......... *H04W 52/30* (2013.01); *H04W 52/10* (2013.01); *H04W 52/247* (2013.01); *H04W 52/383* (2013.01)

(58) Field of Classification Search
CPC ... H04W 52/30; H04W 52/10; H04W 52/247; H04W 52/383
See application file for complete search history.

(56) References Cited

U.S. PATENT DOCUMENTS 9,788,287 B2 * 10/2017 Morita ................ H04W 52/383
9,820,168 B2 11/2017 Sawai et al.
(Continued)

FOREIGN PATENT DOCUMENTS

WO 2020067653 A1 4/2020
WO 2020200165 A1 10/2020

OTHER PUBLICATIONS

International Search Report and Written Opinion—PCT/US2022/013681—ISA/EPO—dated Apr. 26, 2022.

*Primary Examiner* — Dominic E Rego
(74) *Attorney, Agent, or Firm* — Polsinelli LLP

(57) ABSTRACT

Disclosed are systems and techniques for performing sidelink communications. For instance, a first client device can determine a first transmit power parameter for transmitting sidelink communications. The first transmit power parameter can either be received from a base station associated with the first client device or it can be a default parameter based on the first client device not being associated with a base station. The first client device can transmit, to a second client device, a first sidelink transmission having a first power level corresponding to the first transmit power parameter. The first client device can receive, from the second client device, a first sidelink reception having a second power level corresponding to a second transmit power parameter.

30 Claims, 8 Drawing Sheets

(51) Int. Cl.
*H04W 52/30* (2009.01)
*H04W 52/38* (2009.01)

(56) References Cited

U.S. PATENT DOCUMENTS

| | | | |
|---|---|---|---|
| 10,477,559 B2 | 11/2019 | Ökvist et al. | |
| 10,624,076 B2* | 4/2020 | Kim | ................... H04W 52/04 |
| 2008/0069033 A1* | 3/2008 | Li | ................... H04W 52/245 |
| | | | 370/328 |
| 2008/0069039 A1* | 3/2008 | Li | ................... H04W 52/08 |
| | | | 370/329 |
| 2008/0069062 A1* | 3/2008 | Li | ................... H04W 52/383 |
| | | | 370/338 |
| 2009/0010186 A1* | 1/2009 | Li | ................... H04W 52/243 |
| | | | 370/310 |
| 2011/0045786 A1 | 2/2011 | Leinonen et al. | |
| 2011/0110414 A1 | 5/2011 | Papadogiannis et al. | |
| 2013/0329631 A1 | 12/2013 | Alam et al. | |
| 2014/0141789 A1* | 5/2014 | Tarokh | ................... H04W 4/02 |
| | | | 455/450 |
| 2014/0269558 A1 | 9/2014 | Sartori et al. | |
| 2014/0376458 A1* | 12/2014 | Ryu | ................... H04W 72/542 |
| | | | 370/329 |
| 2015/0023281 A1* | 1/2015 | Wu | ................... H04W 72/21 |
| | | | 370/329 |
| 2015/0050929 A1* | 2/2015 | Song | ................... H04W 52/16 |
| | | | 455/552.1 |
| 2015/0208332 A1 | 7/2015 | Baghel et al. | |
| 2016/0183121 A1 | 6/2016 | Kazmi et al. | |
| 2016/0198455 A1 | 7/2016 | Caretti et al. | |
| 2016/0219534 A1 | 7/2016 | Hao et al. | |
| 2016/0255581 A1 | 9/2016 | Aydin et al. | |
| 2016/0269964 A1 | 9/2016 | Murray | |
| 2016/0286492 A1 | 9/2016 | Kliger et al. | |
| 2016/0381545 A1 | 12/2016 | Wang et al. | |
| 2017/0055259 A1 | 2/2017 | Valliappan et al. | |
| 2017/0055285 A1 | 2/2017 | Valliappan et al. | |
| 2017/0208554 A1* | 7/2017 | Hoshino | ................... H04W 52/248 |
| 2017/0339578 A1 | 11/2017 | Brommer et al. | |
| 2017/0347324 A1* | 11/2017 | Yang | ................... H04W 52/245 |
| 2018/0020412 A1* | 1/2018 | Lee | ................... H04W 52/325 |
| 2018/0199338 A1 | 7/2018 | Nimbalker et al. | |
| 2018/0242331 A1 | 8/2018 | Zhu et al. | |
| 2018/0249419 A1 | 8/2018 | Zhang et al. | |
| 2018/0288563 A1 | 10/2018 | Krzych et al. | |
| 2019/0029040 A1 | 1/2019 | Sun et al. | |
| 2019/0053166 A1 | 2/2019 | Nagaraja et al. | |
| 2019/0141651 A1 | 5/2019 | Venkatachalam Jayaraman et al. | |
| 2019/0200363 A1 | 6/2019 | Rajendran | |
| 2019/0208476 A1 | 7/2019 | Wu et al. | |
| 2019/0230599 A1 | 7/2019 | Nam et al. | |
| 2020/0022089 A1 | 1/2020 | Guo | |
| 2020/0059337 A1 | 2/2020 | Yamada et al. | |
| 2020/0068500 A1 | 2/2020 | Liu et al. | |
| 2020/0068502 A1 | 2/2020 | Mao et al. | |
| 2020/0163024 A1 | 5/2020 | Li et al. | |
| 2020/0196246 A1 | 6/2020 | Ryu et al. | |
| 2020/0214018 A1 | 7/2020 | Venugopal et al. | |
| 2020/0228247 A1 | 7/2020 | Guo et al. | |
| 2020/0305169 A1 | 9/2020 | Loehr et al. | |
| 2020/0351833 A1* | 11/2020 | Chae | ................... H04W 72/04 |
| 2020/0359330 A1 | 11/2020 | Zacharias et al. | |
| 2020/0367173 A1 | 11/2020 | Ryu et al. | |
| 2020/0404594 A1* | 12/2020 | Noh | ................... H04W 72/04 |
| 2021/0022084 A1* | 1/2021 | Jiang | ................... H04W 52/383 |
| 2021/0051594 A1* | 2/2021 | Chae | ................... H04W 76/27 |
| 2021/0058856 A1 | 2/2021 | Qi et al. | |
| 2021/0099958 A1 | 4/2021 | Bae et al. | |
| 2022/0039021 A1 | 2/2022 | Ryu et al. | |
| 2022/0240196 A1 | 7/2022 | Zhang et al. | |

\* cited by examiner

CONFIGURING CLIENT DEVICE REGULATION MODES FOR SIDELINK COMMUNICATIONS

CROSS REFERENCE

The present Application is a divisional of U.S. patent application Ser. No. 17/160,305, filed Jan. 27, 2021, which claims priority to India Patent Application No. 202347032070, filed May 5, 2023, the disclosures of which are hereby expressly incorporated by reference herein its entirety.

FIELD OF THE DISCLOSURE

The present disclosure generally relates to wireless communications. Aspects of the disclosure relate to systems and techniques for configuring client device regulation modes for sidelink communications.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards. Aspects of 5G mobile communications may support direct communications between devices, which may be referred to as sidelink communications. Sidelink can also be referred to as PC5. Wi-Fi also includes a protocol for direct device-to-device communications, referred to as a Dedicated Short Range Communication (DSRC) protocol.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing sidelink communications. According to at least one example, a method is provided for performing sidelink communications. The method can include: determining, by a first client device, a first transmit power parameter for transmitting sidelink communications; transmitting, by the first client device to a second client device, a first sidelink transmission having a first power level corresponding to the first transmit power parameter; and receiving, by the first client device from the second client device, a first sidelink reception having a second power level corresponding to a second transmit power parameter.

In another example, an apparatus for performing sidelink communications is provided that includes a memory and at least one processor (e.g., configured in circuitry) coupled to the memory. The at least one processor is configured to: determine a first transmit power parameter for transmitting sidelink communications; transmit, to a client device, a first sidelink transmission having a first power level corresponding to the first transmit power parameter; and receive, from the client device, a first sidelink reception having a second power level corresponding to a second transmit power parameter.

In another example, a non-transitory computer-readable medium is provided that includes stored thereon at least one instruction that, when executed by one or more processors, cause the one or more processors to: determine, by a first client device, a first transmit power parameter for transmitting sidelink communications; transmit, by the first client device to a second client device, a first sidelink transmission having a first power level corresponding to the first transmit power parameter; and receive, by the first client device from the second client device, a first sidelink reception having a second power level corresponding to a second transmit power parameter.

In another example, an apparatus for performing sidelink communications is provided. The apparatus includes: means for determining, by a first client device, a first transmit power parameter for transmitting sidelink communications; means for transmitting, by the first client device to a second client device, a first sidelink transmission having a first power level corresponding to the first transmit power parameter; and means for receiving, by the first client device from the second client device, a first sidelink reception having a second power level corresponding to a second transmit power parameter.

In another example, a method for performing sidelink communications is provided. The method includes: receiving, by a first client device from a second client device, a sidelink reception including an indication of a transmit power parameter associated with the second client device; determining, by the first client device, that a transmit power level corresponding to the transmit power parameter associated with the second client device is lower than a transmit power level corresponding to a transmit power parameter associated with the first client device; and transmitting, by the first client device to the second client device, a first sidelink transmission having the transmit power level corresponding to the transmit power parameter associated with the second client device.

In another example, an apparatus for performing sidelink communications is provided that includes a memory and at least one processor (e.g., configured in circuitry) coupled to the memory. The at least one processor is configured to: receive, from a client device, a sidelink reception including an indication of a transmit power parameter associated with the client device; determine that a transmit power level corresponding to the transmit power parameter associated with the client device is lower than a transmit power level corresponding to a power parameter associated with the apparatus; and transmit, to the client device, a first sidelink transmission having the transmit power level corresponding to the transmit power parameter associated with the client device.

In another example, a non-transitory computer-readable medium is provided that includes stored thereon at least one instruction that, when executed by one or more processors, cause the one or more processors to: receive, by a first client device from a second client device, a sidelink reception including an indication of a transmit power parameter associated with the second client device; determine, by the first client device, that a transmit power level corresponding to the transmit power parameter associated with the second client device is lower than a transmit power level corresponding to a transmit power parameter associated with the first client device; and transmit, by the first client device to the second client device, a first sidelink transmission having the transmit power level corresponding to the transmit power parameter associated with the second client device.

In another example, an apparatus for performing sidelink communications is provided. The apparatus includes: means for receiving, by a first client device from a second client device, a sidelink reception including an indication of a transmit power parameter associated with the second client device; means for determining, by the first client device, that a transmit power level corresponding to the transmit power parameter associated with the second client device is lower than a transmit power level corresponding to a transmit power parameter associated with the first client device; and means for transmitting, by the first client device to the second client device, a first sidelink transmission having the transmit power level corresponding to the transmit power parameter associated with the second client device.

In some aspects, the apparatus is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a tablet, a personal computer, a laptop computer, a server computer, a wireless access point, or other any other device having a radio frequency (RF) interface.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
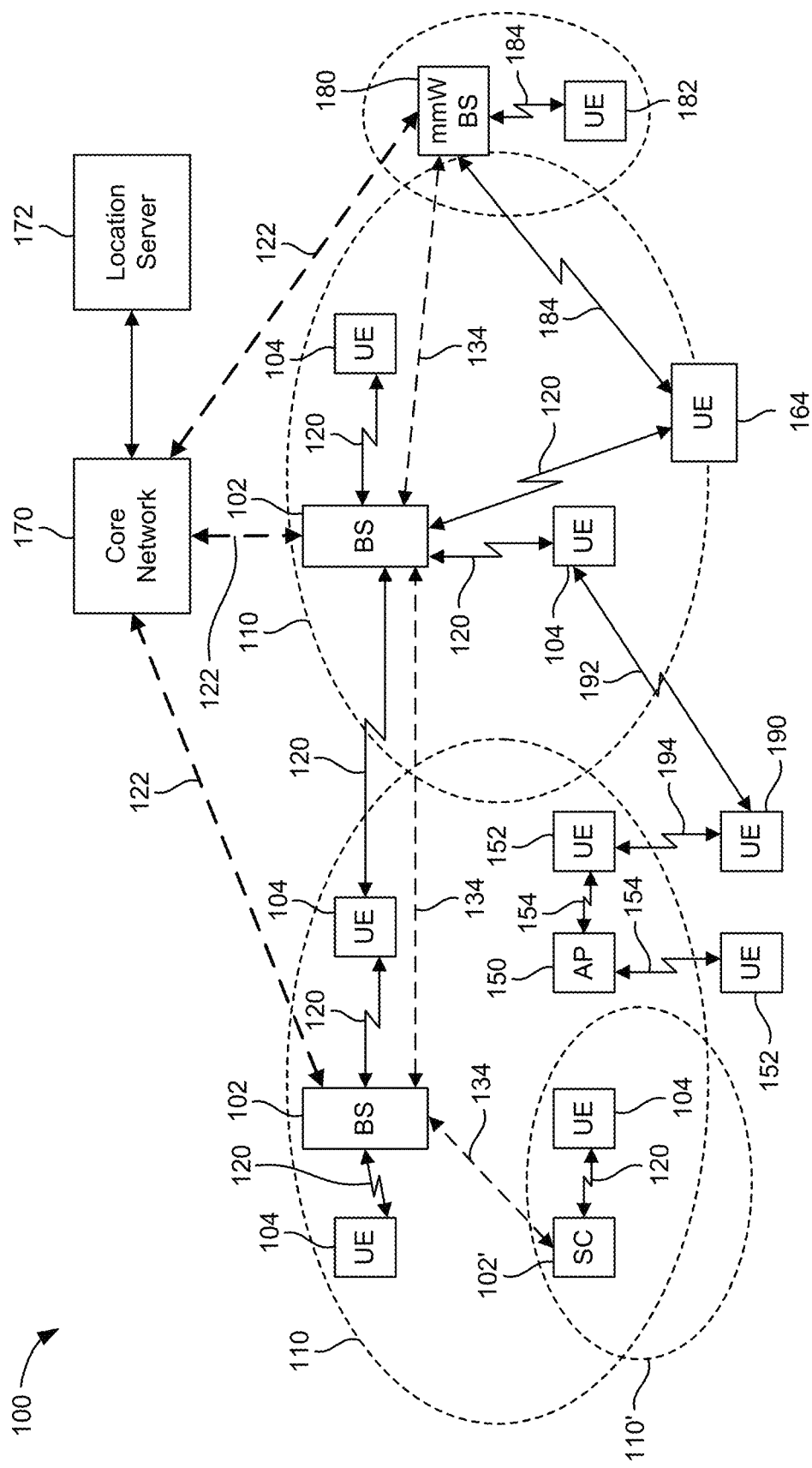
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless communication networks are deployed to provide various communication services such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNB, a 3GPP eNB, a Wi-Fi access point (AP), or other base station). For example, an access link may support uplink signaling, downlink signaling, connection procedures, etc.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHz or 6 GHz). As used herein, the term sidelink can refer to 3GPP sidelink (e.g., using a PC5 sidelink interface), Wi-Fi direct communications (e.g., according to a Dedicated Short Range Communication (DSRC) protocol), or using any other direct device-to-device communication protocol.

The configuration of sidelink communications among client devices can present several challenges. For instance, in order to optimize the quality of the sidelink transmission (e.g., signal-to-noise ratio, received signal strength indicator (RSSI), signal range, etc.), it would be desirable for client devices to transmit sidelink signals using a maximum transmit power level. However, when a client device transmits using its sidelink interface, there is a potential for the sidelink transmission to cause interference on the access links or on sidelinks associated with other client devices. The potential for interference due to sidelink transmission increases with higher transmit power levels.

In addition to these considerations, client devices may also be configured to comply with regulatory standards that can limit the level of transmit power depending on factors such as the client devices' association with a base station, base station regulation mode, frequency band, location (indoor/outdoor), country, client devices' movement, etc.

Systems, apparatuses, processes (also referred to as methods), and computer-readable media (collectively referred to as "systems and techniques") are described herein for performing sidelink communications. The systems and techniques provide the ability for client devices (e.g., UEs) to implement sidelink communications in a manner that optimizes transmit output power and avoids causing interference. As noted above, the sidelink communications can be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol.

In some aspects, client devices can implement sidelink communications in accordance with one or more regulation modes. Examples of regulation modes can include Standard Power (SP) mode, Low Power Indoor (LPI) mode, Very Low Power (VLP) mode, and/or any other regulation mode. In some instances, sidelink communication regulation modes can be associated with one or more parameters that a client device can use for performing sidelink communications. For example, a regulation mode can be associated with a maximum transmit power parameter such as a maximum effective isotropic radiated power (EIRP), a maximum power spectral density (PSD), any other suitable parameter, or any combination thereof.

In some examples, client devices that are associated with a base station can be configured to operate according to a regulation mode corresponding to the base station. For example, a client device that is associated with a base station configured to operate in SP mode may receive an indication of the regulation mode and/or a transmit parameter associated with the regulation mode. The client device may transmit sidelink communications using a power level that corresponds to the regulation mode and/or the transmit power parameter.

In other aspects, a client device can be configured to operate using a default regulation mode. For example, the default regulation mode can be adopted when a client device is not associated with a base station. In some instances, the default regulation mode can implement a transmit power level that is compatible with all regulation modes (e.g., VLP mode). In further examples, the default regulation mode can be adopted irrespective of an association between the client device and a base station.

In some examples, client devices can use their respective regulation modes to implement mixed-mode sidelink communications. In one illustrative example, a client device can transmit sidelink transmissions having a power level corresponding to SP mode and can receive sidelink receptions having a power level corresponding to LPI mode or VLP mode. In another example, a client device configured to implement LPI mode can transmit sidelink transmissions having a power level corresponding to LPI mode, while receiving sidelink receptions having a power level corresponding to SP mode or VLP mode. In another example, a client device configured to implement VLP mode can transmit sidelink transmissions having a power level corresponding to VLP mode, and can receive sidelink receptions having a power level corresponding to SP mode or LPI mode.

In some aspects, the client device may advertise its regulation mode and/or a transmit power parameter(s) associated with its regulation mode to other client devices. Upon receiving the advertising message, other client devices can determine an aligned regulation mode that the two devices can use to communicate via sidelink. The aligned regulation mode can correspond to the client device having the lower maximum transmit power parameter. For example, a client device configured to implement LPI mode can determine that its maximum transmit power parameter and/or its maximum transmit power level is lower than a client device that advertises the SP mode (or a parameter associated with SP mode). In this case, the client device can respond to the advertising message with an indication of the aligned regulation mode and/or power level, and the two devices can implement sidelink communications accordingly.

Various aspects of the techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, UWB, and so on.

In some examples, sidelink communication can be performed using one or more Unlicensed National Information Infrastructure (U-NII) bands. For instance, sidelink communications can be performed in bands corresponding to the U-NII-4 band (5.850-5.925 GHz), the U-NII-5 band (5.925-6.425 GHz), the U-NII-6 band (6.425-6.525 GHz), the U-NII-7 band (6.525-6.875 GHz), the U-NII-8 band (6.875-7.125 GHz), or any other frequency band that may be suitable for performing sidelink communications.

In some cases, a client device such as UE 190 may be configured to perform sidelink communications in accordance with one or more regulation modes that can be associated with one or more operating parameters. For example, UE 190 can be configured to operate in a Standard Power (SP) mode, a Low Power Indoor (LPI) mode, a Very Low Power (VLP) mode, or any other regulation mode.

In some examples, each regulation mode can be associated with operating parameters that can include a maximum effective isotropic radiated power (EIRP). In some configurations, SP mode can correspond to a maximum EIRP of 30 dBm, LPI mode can correspond to a maximum EIRP of 24 dBm, and VLP mode can correspond to a maximum EIRP of 14 dBm. In other examples, the parameters associated with regulation mode can include power spectral density (PSD), effective radiated power (ERP), or any other parameter for configuring sidelink communications. Those skilled in the art will understand that the parameters and corresponding values set forth herein are provided as example configurations and that the disclosed systems and techniques may be implemented using different variations of parameters and values.

In some cases, the regulation mode for a client device such as UE 104 can correspond to the regulation mode of an associated access point or base station. In the example of UE 104, the regulation mode can correspond to a regulation mode of BS 102. In the example of UE 152, the regulation mode can correspond to a regulation mode of AP 150. In some examples, a client device (e.g., UE 104 or UE 152) can communicate with an associated base station or access point to obtain the regulation mode and determine the parameter associated therewith. In other examples, a client device may receive one or more parameters from the base station or access point, such as a maximum transmit power.

In other cases, a UE that is not associated with an access point or a base station can be configured to operate in accordance with a default regulation mode. For instance, UE 190 can be configured to operate in accordance with a default VLP mode. In one example, UE 190 can transmit sidelink communications to UE 152 and to UE 104 using parameters associated with its default regulation mode.

Figure 2:
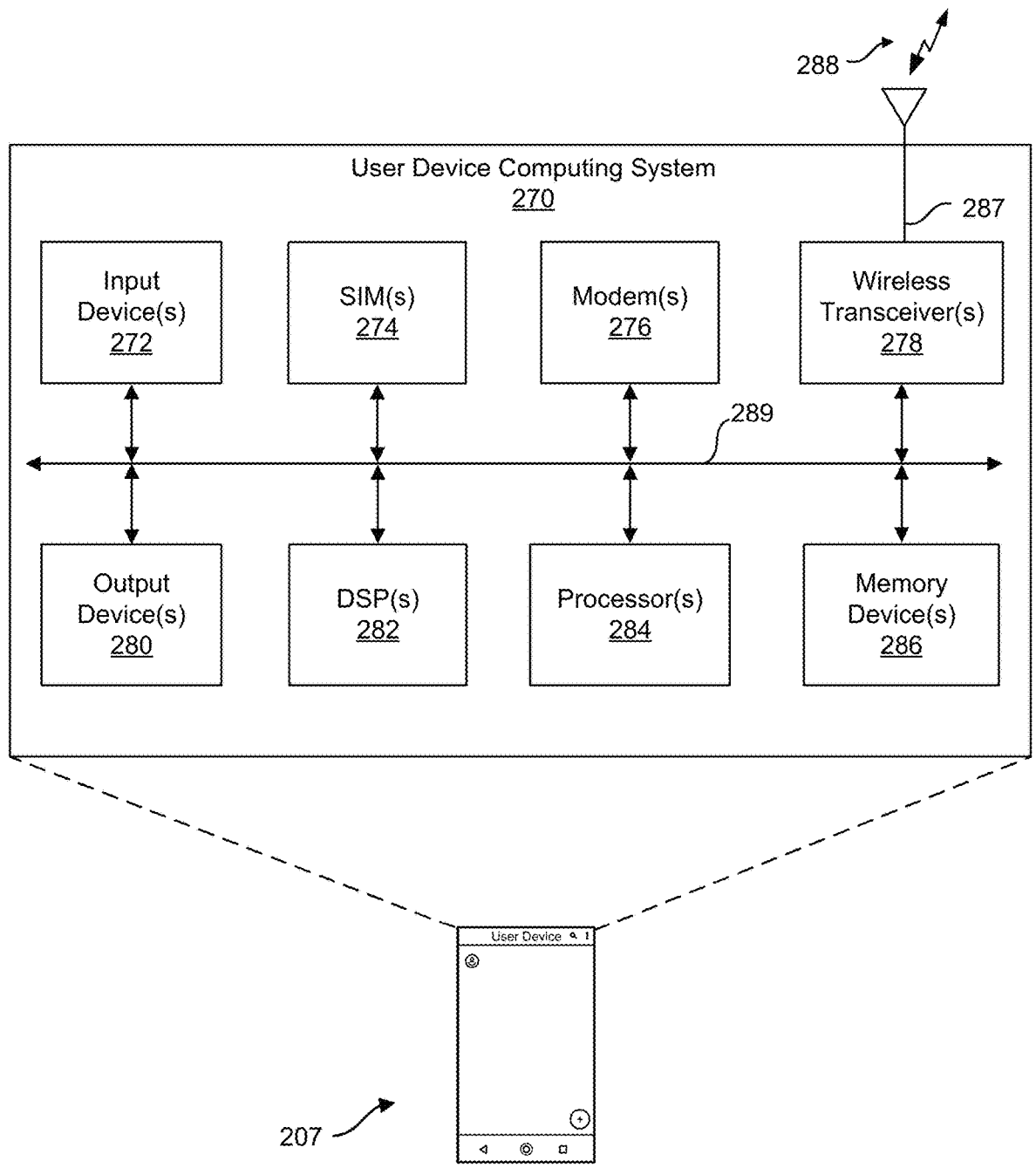
FIG. 2 is a block diagram illustrating an example of a computing system of a client device, in accordance with some examples.

FIG. 2 illustrates an example of a computing system 270 of a client device 207. The client device 207 can include a UE (e.g., UE 104, UE 152, UE 190) or other type of device (e.g., a station (STA) configured to communication using a Wi-Fi interface) that can be used by an end-user. For example, the client device 207 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, and/or another device that is configured to communicate over a wireless communications network. The computing system 270 includes software and hardware components that can be electrically or communicatively coupled via a bus 289 (or may otherwise be in communication, as appropriate). For example, the computing system 270 includes one or more processors 284. The one or more processors 284 can include one or more CPUs, ASICs, FPGAs, APs, GPUs, VPUs, NSPs, microcontrollers, dedicated hardware, any combination thereof, and/or other processing device or system. The bus 289 can be used by the one or more processors 284 to communicate between cores and/or with the one or more memory devices 286.

The computing system 270 may also include one or more memory devices 286, one or more digital signal processors (DSPs) 282, one or more subscriber identity modules (SIMs) 274, one or more modems 276, one or more wireless transceivers 278, one or more antennas 287, one or more input devices 272 (e.g., a camera, a mouse, a keyboard, a touch sensitive screen, a touch pad, a keypad, a microphone, and/or the like), and one or more output devices 280 (e.g., a display, a speaker, a printer, and/or the like).

In some aspects, computing system 270 can include one or more radio frequency (RF) interfaces configured to transmit and/or receive RF signals. In some examples, an RF interface can include components such as modem(s) 276, wireless transceiver(s) 278, and/or antennas 287. The one or more wireless transceivers 278 can transmit and receive wireless signals (e.g., signal 288) via antenna 287 from one or more other devices, such as other client devices, network devices (e.g., base stations such as eNBs and/or gNBs, Wi-Fi access points (APs) such as routers, range extenders or the like, etc.), cloud networks, and/or the like. In some examples, the computing system 270 can include multiple antennas or an antenna array that can facilitate simultaneous transmit and receive functionality. Antenna 287 can be an omnidirectional antenna such that radio frequency (RF) signals can be received from and transmitted in all directions. The wireless signal 288 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 288 may be transmitted directly to other client devices using sidelink communications (e.g., using a PC5 interface, using a DSRC interface, etc.). Wireless transceivers 278 can be configured to transmit RF signals for performing sidelink communications via antenna 287 in accordance with one or more transmit power parameters that can be associated with one or more regulation modes. Wireless transceivers 278 can also be configured to receive sidelink communication signals having different signal parameters from other client devices.

In some examples, the one or more wireless transceivers 278 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 288 into a baseband or intermediate frequency and can convert the RF signals to the digital domain.

In some cases, the computing system 270 can include a coding-decoding device (or CODEC) configured to encode and/or decode data transmitted and/or received using the one or more wireless transceivers 278. In some cases, the computing system 270 can include an encryption-decryption device or component configured to encrypt and/or decrypt data (e.g., according to the AES and/or DES standard) transmitted and/or received by the one or more wireless transceivers 278.

The one or more SIMs 274 can each securely store an international mobile subscriber identity (IMSI) number and related key assigned to the user of the client device 207. The IMSI and key can be used to identify and authenticate the subscriber when accessing a network provided by a network service provider or operator associated with the one or more SIMs 274. The one or more modems 276 can modulate one or more signals to encode information for transmission using the one or more wireless transceivers 278. The one or more modems 276 can also demodulate signals received by the one or more wireless transceivers 278 in order to decode the transmitted information. In some examples, the one or more modems 276 can include a Wi-Fi modem, a 4G (or LTE) modem, a 5G (or NR) modem, and/or other types of modems. The one or more modems 276 and the one or more wireless transceivers 278 can be used for communicating data for the one or more SIMs 274.

The computing system 270 can also include (and/or be in communication with) one or more non-transitory machine-readable storage media or storage devices (e.g., one or more memory devices 286), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 286 and executed by the one or more processor(s) 284 and/or the one or more DSPs 282. The computing system 270 can also include software elements (e.g., located within the one or more memory devices 286), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the client device 207 can include means for performing operations described herein. The means can include one or more of the components of the computing system 270. For example, the means for performing operations described herein may include one or more of input device(s) 272, SIM(s) 274, modems(s) 276, wireless transceiver(s) 278, output device(s) (280), DSP(s) 282, processors (284), memory device(s) 286, and/or antenna(s) 287.

In some aspects, client device 207 can include: means for determining, by a first client device, a first transmit power parameter for transmitting sidelink communications; means for transmitting, by the first client device to a second client device, a first sidelink transmission having a first power level corresponding to the first transmit power parameter; and means for receiving, by the first client device from the second client device, a first sidelink reception having a second power level corresponding to a second transmit power parameter. In some examples, the means for determining can include the one or more processors 284, the one or more DSPs 282, the one or more memory devices 286, any combination thereof, or other component(s) of the client device. In some examples, the means for transmitting can include the one or more wireless transceivers 278, the one or more modems 276, the one or more SIMs 274, the one or more processors 284, the one or more DSPs 282, the one or more memory devices 286, any combination thereof, or other component(s) of the client device. In some examples, the means for receiving can include the one or more wireless transceivers 278, the one or more modems 276, the one or more SIMs 274, the one or more processors 284, the one or more DSPs 282, the one or more memory devices 286, any combination thereof, or other component(s) of the client device.

In some examples, client device 207 can include: means for receiving, by a first client device from a second client device, a sidelink reception including an indication of a transmit power parameter associated with the second client device; means for determining, by the first client device, that a transmit power level corresponding to the transmit power parameter associated with the second client device is lower than a transmit power level corresponding to a transmit power parameter associated with the first client device; and means for transmitting, by the first client device to the second client device, a first sidelink transmission having the transmit power level corresponding to the transmit power parameter associated with the second client device. In some examples, the means for receiving can include the one or more wireless transceivers 278, the one or more modems 276, the one or more SIMs 274, the one or more processors 284, the one or more DSPs 282, the one or more memory devices 286, any combination thereof, or other component (s) of the client device. In some examples, the means for determining can include the one or more processors 284, the one or more DSPs 282, the one or more memory devices 286, any combination thereof, or other component(s) of the client device. In some examples, the means for transmitting can include the one or more wireless transceivers 278, the one or more modems 276, the one or more SIMs 274, the one or more processors 284, the one or more DSPs 282, the one or more memory devices 286, any combination thereof, or other component(s) of the client device.

Figure 3:
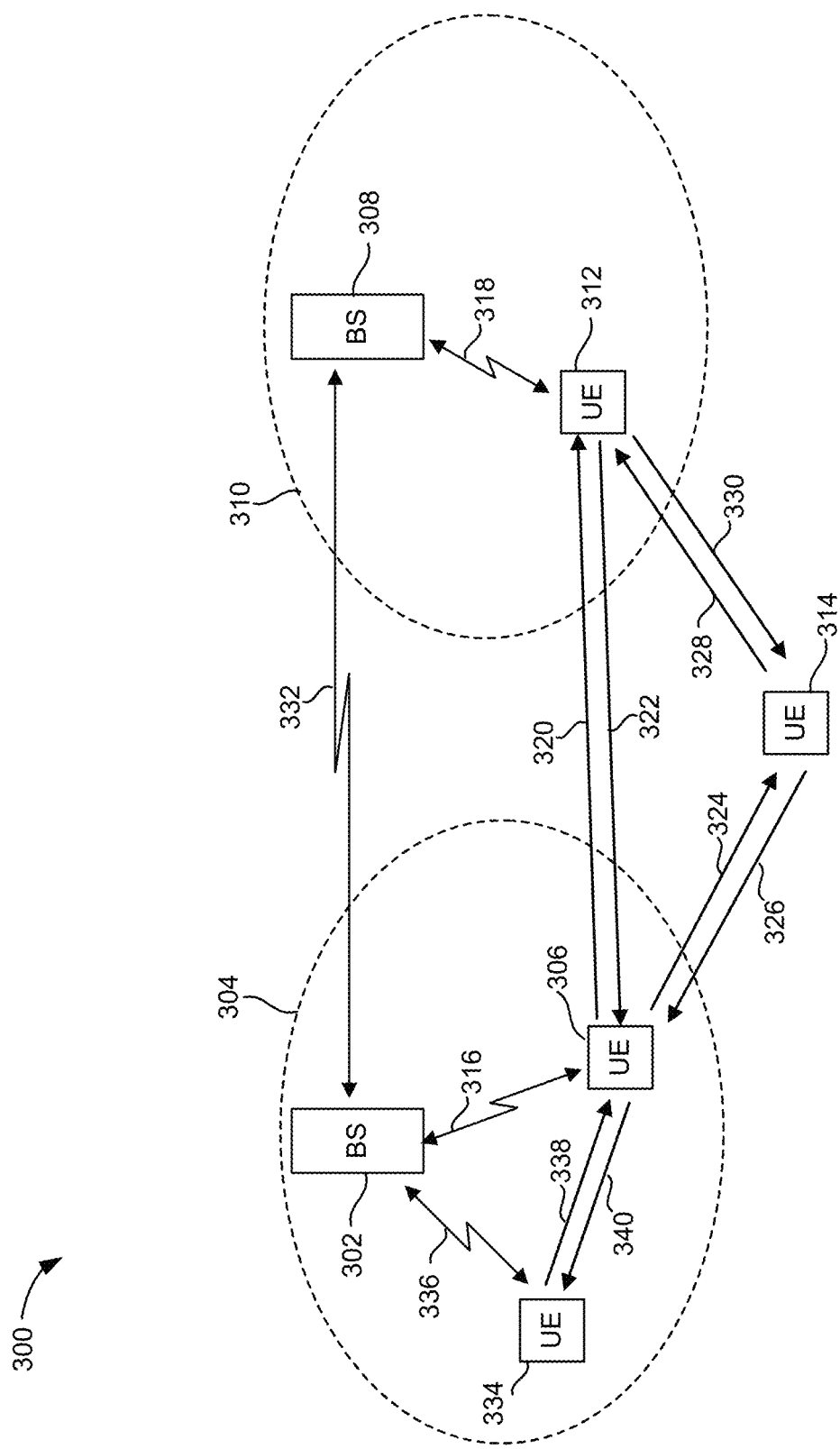
FIG. 3 is a block diagram illustrating another example of a wireless communication network, in accordance with some examples.

As noted above, systems and techniques are described herein for performing sidelink communications. FIG. 3 illustrates an example of a wireless communication system 300 including devices configured to perform sidelink communications. While the system 300 is described using user equipment (UE) and base stations (BS s) as illustrative examples, the techniques described with respect to the system 300 can be performed by Wi-Fi stations (STA) and access points (APs) or by other devices that communicate using other communication protocols.

As illustrated in FIG. 3, the system 300 includes a base station 302 having a coverage area 304. The system 300 also includes a base station 308 having a coverage area 310. In some aspects, base station 302 and base station 308 can include macro cell base stations and/or micro cell base stations, as described in connection with system 100 (e.g., base stations 102). In other aspects, base station 302 and base station 308 can include a wireless access point, such as, for example, AP 150 described in connection with system 100. In some examples, base station 302 and base station 308 can communicate with each other using communication link 332.

In some examples, system 300 can include one or more client devices, such as UE 306, UE 312, UE 314, and UE 334. As illustrated, UE 306 and UE 334 are within coverage area 304 corresponding to base station 302. In some examples, UE 306 and UE 334 can be associated with base station 302 and can communicate with base station 302 using communication links 316 and communications links 336, respectively. In some examples, communication links 316 and communications links 336 may utilize an unlicensed frequency spectrum (e.g. 6 GHz).

In some cases, system 300 can further include UE 312 located within coverage area 310 corresponding to base station 308. In some examples, UE 312 can be associated with base station 308 and can communicate with base station 308 using communication links 318. In some cases, communication links 318 between UE 312 and base station 308 may utilize various frequencies of an unlicensed frequency spectrum (e.g., 6 GHz).

In some configurations, system 300 can further include UE 314 which can be located in a geographic area outside the coverage area of any base station (e.g., outside of coverage area 304 and coverage area 310). In some aspects, one or more of the UEs in system 300 (e.g., UE 306, UE 312, and UE 314) can be configured to perform sidelink communications. For instance, UE 306 and UE 312 can be configured to perform sidelink communications with each other using communication links 320 and 322. In one example, communication link 320 can represent a sidelink transmission with respect to UE 306 and a sidelink reception with respect to UE 312. Communication link 322 can represent a sidelink reception with respect to UE 306 and a sidelink transmission with respect to UE 312.

In another example, UE 306 and UE 314 can be configured to perform sidelink communications with each other using communication links 324 and 326. In one configuration, communication link 324 can represent a sidelink transmission with respect to UE 306 and a sidelink reception with respect to UE 314. Communication link 326 can represent a sidelink reception with respect to UE 306 and a sidelink transmission with respect to UE 314.

In another aspect, UE 312 and UE 314 can be configured to perform sidelink communications with each other using communication links 328 and 330. In one example, communication link 328 can represent a sidelink transmission with respect to UE 314 and a sidelink reception with respect to UE 312. Communication link 330 can represent a sidelink reception with respect to UE 314 and a sidelink transmission with respect to UE 312.

In another aspect, UE 306 and UE 334 can be configured to perform sidelink communications with each other using communication links 338 and 340. In one example, communication link 338 can represent a sidelink transmission with respect to UE 334 and a sidelink reception with respect to UE 306. Communication link 340 can represent a sidelink reception with respect to UE 334 and a sidelink transmission with respect to UE 306.

In some aspects, each of the UEs in system 300 can be configured to perform sidelink communications in accordance with one or more regulation modes. Examples of regulation modes can include Standard Power (SP) mode, Low Power Indoor (LPI) mode, Very Low Power (VLP) mode, and/or any other regulation mode. In some instances, sidelink communication regulation modes can be associated with one or more parameters that a client device can use for configuring an RF interface for performing sidelink communications. For example, a regulation mode can be associated with a maximum transmit power parameter such as a maximum effective isotropic radiated power (EIRP).

In some examples, client devices such as UE 306, UE 312 and UE 334 can be configured to operate using a regulation mode corresponding to a base station with which the client device is associated. For instance, UE 306 can be configured to use a regulation mode corresponding to base station 302, and UE 312 can be configured to use a regulation mode corresponding to base station 308.

In one example, base station 302 may be configured to operate using SP mode. Base station 302 can then configure one or more associated client devices (e.g., UE 306 and UE 334) to perform sidelink communications using SP mode. In one example, base station 302 may use communications links 316 to provide UE 306 with configuration information relating to its regulation mode. In one example, base station 302 may provide UE 306 with a message and/or data (e.g., as part of Radio Resource Control (RRC) protocol) that includes a reference to the regulation mode (e.g., SP mode). Any signaling (e.g., one or more downlink channels) or message type can be used by the base station 302 to send the message to the UE 306. In some aspects, base station 302 may provide the message and/or data to UE 306 as part of a Master Information Block (MIB) that can be transmitted using the Physical Broadcast Channel (PBCH). In some cases, base station 302 may provide the message and/or data to UE 306 as part of a System Information Block (SIB) message that can be transmitted by base station 302 using the Physical Downlink Shared Channel (PDSCH). In some examples, base station 302 can send one or more messages to UE 306 when UE 306 enters a coverage area associated with base station 302, upon initialization or association of UE 306, and/or at any time thereafter. Messages from base station 302 to UE 306 can be sent periodically or asynchronously. In some aspects, UE 306 can receive the message(s) and determine one or more parameters associated with the regulation mode. For instance, UE 306 may determine a maximum allowed transmit power (e.g., a maximum effective isotropic radiated power (EIRP), a maximum EIRP power spectral density (PSD), etc.) that is associated with the regulation mode.

For example, base station 302 may provide UE 306 with a message that includes a transmit power parameter for configuring the UE's sidelink communication interface in accordance with the regulation mode (e.g., SP mode) associated with base station 302. The base station 302 can provide UE 306 a message that includes one or more transmit power parameters and corresponding values (e.g., maximum EIRP is 30 dBm, a maximum EIRP PSD is 17 dBm/MHz, or both). UE 306 may then utilize this transmit power parameter in configuring the RF interface (e.g., configuring one or more power amplifiers in wireless transceiver(s) 278) for performing sidelink configurations that correspond with SP mode. For example, UE 306 may configure its RF interface to transmit a sidelink transmission 320 at a power level that is at or below the maximum power level associated with the transmit power parameter. In some aspects, client devices such as UE 306 may include an indication of their corresponding regulation mode and/or regulation mode parameters in one or more sidelink communications. For example, the regulation mode and/or regulation mode parameters can be included as part of sidelink control information (SCI) within a sidelink data channel such as Physical Sidelink Shared Channel (PSSCH) or as part of a sidelink control channel such as Physical Sidelink Control Channel (PSCCH).

In another implementation, base station 308 may be configured to operate using LPI mode. Base station 308 can then configure one or more associated client devices (e.g., UE 312) to perform sidelink communications using LPI mode. In one example, base station 308 may use communications links 318 to provide UE 312 with configuration information relating to its regulation mode. For instance, base station 302 may provide UE 306 with a message that includes a transmit power parameter for configuring the UE's sidelink communication interface in accordance with its regulation mode (e.g., LPI mode). For instance, base station 302 may provide UE 306 a message that includes a transmit power parameter and a corresponding value (e.g., maximum EIRP is 24 dBm). UE 306 may then utilize this parameter in configuring the RF interface for performing sidelink configurations. For example, UE 306 may configure its RF interface to transmit a sidelink transmission 320 at a power level that is at or below the maximum power level associated with the parameter.

In some cases, base station 308 may provide UE 312 with a message that includes a reference to the regulation mode (e.g., LPI mode). UE 312 can receive this message and determine one or more parameters associated with the regulation mode. For instance, UE 312 may determine a maximum allowed transmit power that is associated with the regulation mode. In some aspects, base station 308 may provide UE 312 with a message that includes the regulation mode and any parameters and/or corresponding values associated with the regulation mode.

In some examples, client devices can be configured to operate using a default regulation mode. For instance, a client device such as UE 314 that is not associated with any base station may perform sidelink communications using a default mode that corresponding to a permissible transmit power parameter. In one aspect, the default regulation mode may correspond to a Very Low Power (VLP) mode. In other aspects, client devices that are associated with a base station may utilize a default regulation mode prior to obtaining information regarding the regulation mode associated with the base station. In some cases, a client device may transition from a regulation mode associated with a base station to a default regulation mode based on movement by the client device outside of a coverage area.

In one configuration, each of the client devices (e.g., UE 306, UE 312, and UE 314) can perform mixed-mode sidelink communications in which each client device uses its respective regulation mode. For example, UE 306 can transmit sidelink transmission 320 to UE 312 using a power level corresponding to the transmit power parameter UE 306 obtained from base station 302 (e.g., parameter associated with SP mode). In response, UE 312 can transmit sidelink transmission 322 to UE 306 using a power level corresponding to the transmit power parameter UE 312 obtained from base station 308 (e.g., parameter associated with LPI mode).

In another example, UE 306 can transmit sidelink transmission 324 to UE 314 using a power level corresponding to the transmit power parameter UE 306 obtained from base station 302 (e.g., parameter associated with SP mode). In response, UE 314 can transmit sidelink transmission 326 to UE 306 using a power level corresponding to a transmit power parameter associated with a default regulation mode (e.g., VLP mode) because UE 314 is not presently associated with any base stations.

In another aspect, UE 312 can transmit sidelink transmission 330 to UE 314 using a power level corresponding to the transmit power parameter UE 312 obtained from base station 308 (e.g., parameter associated with LPI mode). In response, UE 314 can transmit sidelink transmission 328 to UE 312 using a power level corresponding to a transmit power parameter associated with a default regulation mode (e.g., VLP mode) because UE 314 is not presently associated with any base stations.

Based on the foregoing examples, systems and techniques described herein can be used for performing mixed-mode sidelink communications in which each client device transmits sidelink transmissions having a power level in accordance with the regulation mode corresponding to the client device. For example, a client device operating in SP mode can transmit sidelink communications having a power level corresponding to an SP transmit power parameter to client devices operating in LPI mode or to client devices operating in VLP mode. In another example, a client device operating in LPI mode can transmit sidelink communications having a power level corresponding to an LPI mode transmit power parameter to client devices operating in SP mode or to client devices operating in VLP mode. In another aspect, a client device operating in VLP mode can transmit sidelink communications having a power level corresponding to a SP mode transmit power parameter to client devices operating in SP mode or to client devices operating in LPI mode.

In some implementations, client devices can be configured to perform sidelink communications utilizing an aligned regulation mode corresponding to the regulation mode associated with the lower transmit power parameter among the two client devices. For example, a client device such as UE 306 can transmit a message or signal that includes an indication of the regulation mode associated with UE 306 (e.g., an "advertising" message). In one case, the advertising message from UE 306 can include an indication (e.g., data) that informs other client devices (e.g., UE 312 and UE 314) that UE 306 can operate in SP mode. In another example, the advertising message from UE 306 can include an indication (e.g., data) that informs other client devices (e.g., UE 312 and UE 314) of a transmit power parameter associated with UE 306 (e.g., a maximum EIRP). In some aspects, UE 306 can transmit the advertising message using a low power level that is compatible with all regulation modes. For example, UE 306 can transmit the advertising message using a power level associated with VLP mode.

In some examples, client devices can respond to an advertising message with a sidelink response message that can align the regulation mode of the two client devices. For instance, based on the advertising message from UE 306, UE 312 can determine that its regulation mode (e.g., LPI mode) is associated with a transmit power level that is lower than the transmit power level associated with UE 306. UE 312 can respond to the advertising message using a power level that corresponds to a LPI mode transmit power parameter. Upon receiving the response from UE 312, UE 306 can determine the aligned regulation mode (e.g., LPI mode) and/or the aligned transmit power parameter for performing sidelink communications with UE 312. In this example, UE 306 can transmit sidelink transmissions 320 using a power level that is lower than the power level that corresponds to its regulation mode (e.g., SP mode) and UE 306 can also transmit uplink signals to base station 302 (e.g., communication links 316) using a power level corresponding to its regulation mode.

In another example, UE 312 can send an advertising message that includes an indication of its regulation mode (e.g., LPI mode) and/or its maximum transmit power parameter. The UE 312 can use any signaling (e.g., one or more channels) or message type to send an advertising message. In some cases, the advertising message can be sent as a connection-less groupcast (e.g., broadcast) message that can be received by one or more client devices that may be within range of the message. In some examples, the advertising message can be sent as a multicast message that is directed to a group of client devices. In some instances, the advertising message can be sent as a unicast sidelink message that is directed to a particular client device. In some aspects, UE 312 can send the advertising message using a low power level compatible with all regulation modes (e.g., VLP mode). Based on the advertising message from UE 312, UE 314 can determine that its regulation mode (e.g., VLP mode) is associated with a lower power level and UE 314 can respond to UE 312 (e.g., via sidelink transmission 328) with an indication of a transmit power parameter or regulation mode associated with UE 314. Based on this communication, UE 314 and UE 312 can perform sidelink communications in an aligned regulation mode that corresponds to the regulation mode and/or transmit power parameter associated with UE 314 (e.g., the lower power level of the two client devices).

In some cases, based on the advertising message from UE 312, UE 306 can determine that its regulation mode (e.g., SP mode) is associated with a higher power level than the power level advertised by UE 312. UE 306 can respond to UE 312 (e.g., via sidelink transmission 320) using a transmit power level corresponding to the transmit power level advertised by UE 312. Based on this communication, UE 306 and UE 312 can perform sidelink communications in an aligned regulation mode that corresponds to the regulation mode and/or transmit power parameter associated with UE 312 (e.g., the lower power level of the two client devices). According to these examples, it is noted that a client device (e.g., UE 312) can perform sidelink communications with multiple other client devices (e.g., UE 314 and UE 306) using different regulation modes and/or transmit power levels.

In another example, a client device such as UE 312 can transmit uplink signals (e.g., communication links 318) to base station 308 using an uplink power level that corresponds to the regulation mode associated with UE 312 and base station 308. In some cases, a client device can transmit uplink signals and perform sidelink communications at or near the same time. For example, UE 306 may transmit uplink signals (e.g., communication links 316) to base station 302 at or near the same time as it sends sidelink transmission 320 to UE 312. In some cases, UE 306 may be configured to transmit a first portion of signal elements using a power level corresponding to the power level sending sidelink transmission 320 to UE 312 and a second portion of signal element using a power level corresponding to the uplink power level. In some instances, the signal can be a time-division multiplexed (TDM) signal and the signal elements can correspond to time slots. In other aspects, the signal can be a frequency-division multiplexed (FDM) and the signal elements can correspond to sub-bands.

In some examples, client devices can be configured to transmit sidelink communications to multiple other client devices (e.g., groupcast or broadcast transmissions). For instance, UE 306 can be configured to transmit a broadcast message (e.g., a connection-less groupcast) that can be received by any client device that is within range or a multicast message that is directed toward a particular group of client devices. In some aspects, UE 306 can transmit the broadcast message using a transmit power parameter associated with a broadcast regulation mode. In some instances, the broadcast regulation mode can be the same as the default regulation mode (e.g., VLP mode).

In some cases, UE 306 can be configured to transmit a connection-based groupcast message using sidelink communications. For example, UE 306 can be configured to transmit a groupcast message that is intended for UE 312 and UE 314. In some implementations, the connection based groupcast message can be sent using a power level that corresponds to the lowest or minimum regulation mode among the clients. In this instance, the connection-based groupcast message can be sent using a power level associated with VLP mode, which corresponds to the lowest mode in the group and is being used by UE 314. In some aspects, client devices can respond to a connection-based groupcast message by applying a power level corresponding to the minimum or lowest regulation mode between itself and the transmit client (e.g., UE 306). For example, UE 312 can respond to UE 306 using a power level corresponding to LPI mode and UE 314 can respond to UE 306 using a power level corresponding to VLP mode.

In some aspects, client devices in system 300 can be configured to perform base station assisted sidelink communications. For example, base station 302 can assist in configuring UE 306 and UE 334 to perform sidelink communications with each other. In one case, base station 302 can communicate with UE 306 and UE 334 (e.g., via communication links 316 and 336, respectively) to provide the regulation mode and/or the transmit power parameter that UE 306 and UE 334 will use to configure their respective sidelink transmissions. In one example, UE 306 and UE 334 may perform sidelink communications using transmit power parameters corresponding to a mode associated with base station 302 (e.g., SP mode).

In another example, base station 302 may communicate with base station 308 (e.g., via communication links 332) to facilitate base station assisted sidelink communications between UE 306 and UE 312. For instance, base station 302 may determine a regulation mode associated with UE 312 from base station 308, and base station 308 may determine a regulation mode associated with UE 306 from base station 302. Base station 302 can provide the regulation mode associated with UE 312 (e.g., LPI mode) to UE 306 and base station 308 can provide the regulation mode associate with UE 306 (e.g., SP mode) to UE 312. UE 306 and UE 312 can then establish sidelink communications using transmit power levels that are aligned to the lower of the two regulation modes (e.g., LPI mode) without advertising their respective regulation modes.

In another implementation, client devices in system 300 can be configured to perform sidelink communications using a default transmit power level. For example, UE 334 and UE 306 can perform sidelink communications using a transmit power level that is compatible with all regulation modes (e.g., a power level that is less than or equal to the maximum power level permitted under VLP mode). In some aspects, a default power level can be used to minimize disruption in sidelink communications when a client device enters or exits the coverage area associated with a base station. For example, UE 306 may move outside of coverage area 304 that is associated with base station 302 and continue performing sidelink communications with UE 334. In another example, UE 306 may move from coverage area 304 to coverage area 310 and subsequently associate with base station 308. In some instances, UE 306 may continue to perform sidelink communications with UE 334 using a default transmit power level that will not interfere with the regulation mode of base station 308. In some examples, configuration of sidelink communications using a default power level can be dependent upon the operating band of the client device. For instance, a client device may be configured to utilize a default power level corresponding to VLP mode when the client is transmitting in a particular one of the U-NII bands.

Figure 4:
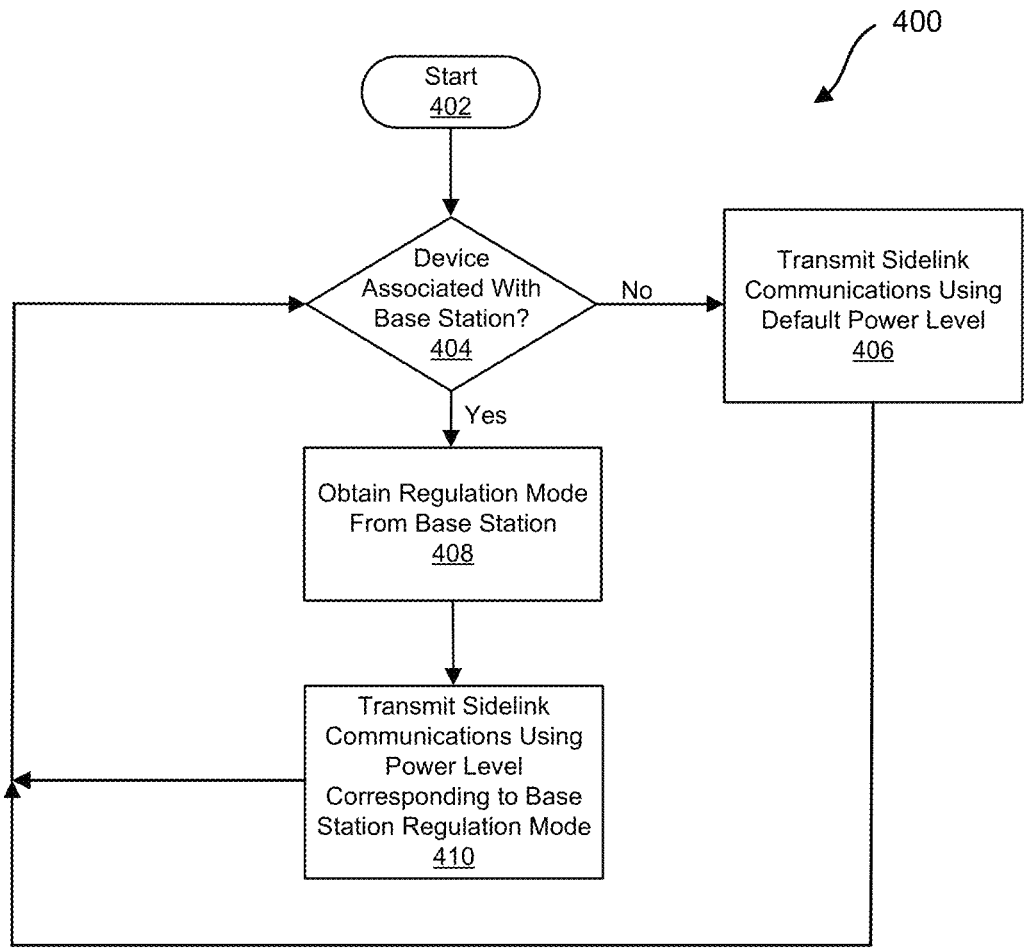
FIG. 4 is a flow diagram illustrating an example of a process for performing sidelink communications, in accordance with some examples.

FIG. 4 is a flow diagram illustrating an example of a process 400 for performing sidelink communications. The process 400 may begin at operation 402 which can include a client device booting up and/or initiating operations relating to sidelink communications. At operation 404, a client device may determine whether it is associated with a base station (e.g., base station 302). A client device may be associated with a base station when it is communicatively coupled to the base station and/or remains within a coverage area or zone for the base station.

At operation 404, a client device may determine that it is not associated with a base station and the process 400 can proceed to operation 406 in which the client device can obtain, adopt, and/or otherwise utilize a default regulation mode (e.g., Very Low Power (VLP) mode). The client device can transmit sidelink communications using a transmit power level corresponding to a transmit power parameter associated with the default mode. An example of a transmit power parameter can be a maximum effective isotropic radiated power (EIRP). In one example, the maximum EIRP associated with VLP mode may be 14 dBm. In accordance with this transmit power parameter, a client device may transmit sidelink communications having a power level that is less than or equal to 14 dBm.

If, at operation 404, a client device determines that it is associated with a base station, the process 400 can proceed to operation 408 in which the client device obtains a regulation mode from the associated base station. For example, a client device that is associated with a base station may transmit sidelink communications using a transmit power level associated with the regulation mode corresponding to the base station (e.g., Standard Power (SP) mode, Low Power Indoor (LPI) mode, Very Low Power (VLP) mode, or any other regulation mode). In one example, a base station may provide the regulation mode and/or data relating to a transmit power parameter that is associated with regulation mode to the client upon association and/or at periodic time intervals. In some aspects, a base station may utilize the Physical Broadcast Channel (PBCH), the Physical Downlink Control Channel (PDCCH), the Physical Downlink Shared Channel (PDSCH), any combination thereof, and/or any other channel that is suitable for a base station to communicate the regulation mode and/or the transmit power parameter to a client device. In one illustrative example, a base station may provide an indication of a regulation mode or of a transmit power parameter as part of Downlink Control Information (DCI) conveyed using the PDCCH.

In another example, the client device may send a communication to the base station requesting a regulation mode and/or a transmit power parameter. In some aspects, the client device may utilize the Physical Random Access Channel (PRACH) to request the regulation mode and/or the transmit power parameter (e.g., a client device that is not associated with a base station may utilize PRACH). In some cases, the client device may utilize the Physical Uplink Shared Channel (PUSCH), the Physical Uplink Control Channel (PUCCH), and/or any other channel that is suitable for a client device to request the regulation mode and/or the transmit power parameter from a base station.

In some aspects, the client device may be authorized to transmit under a regulation mode for a specific amount of time. For example, the base station may communicate a timer to the client device, and upon expiration of the timer (or before), the client device must cease sidelink transmission using the power level associated with the regulation mode or the client device must receive renewed authorization (e.g., new timer) to continue transmitting under the regulation mode associated with the base station. In some cases, the base station may signal a client device upon expiration of the regulation mode timer in order to instruct the client device to switch the power level of its sidelink transmissions. In some aspects, if a client device is no longer authorized to transmit utilizing a power level corresponding to a regulation mode of the associated base station, the client device may switch to a default regulation mode as discussed in connection with operation 406.

In some examples, a system (e.g., system 300) may be configured to perform base station assisted sidelink communications. For instance, a base station (e.g. base station 302) may identify two clients for sidelink communications and may determine the regulation mode and/or transmit power parameters that the respective clients are to use in performing sidelink communications. For example, operation 408 can include obtaining a regulation mode from a base station that is to be used for sidelink communications with a particular client device. In some instances, the regulation mode obtained from the base station may differ from the regulation mode that is being used by the base station. For example, a base station may instruct a client device to utilize LPI mode for sidelink communications with a different client device while operating under SP mode. In this case, the client device may utilize different power levels and/or regulation modes for its sidelink communications and its uplink transmissions.

At operation 410, the process 400 includes transmitting sidelink communications using a power level corresponding to the regulation mode obtained from the base station. In some examples, a client device may transmit using a power level corresponding to a Standard Power (SP) mode, a Low Power Indoor (LPI) mode, a Very Low Power (VLP) mode, or any other mode. A client device may utilize its own regulation mode and/or its own transmit power parameter(s) to determine the power level for sidelink transmissions. The client device may also receive sidelink receptions having power levels that correspond to different regulation modes. For instance, the client device can perform mixed-mode sidelink communications by sending sidelink transmission having a power level corresponding to SP mode and receiving responsive sidelink receptions having a power level corresponding to VLP mode.

After operation 410, the process 400 can return to operation 404 to continue to monitor for association between client device and base station. For example, a client device that was previously associated with a base station may have moved outside of the coverage area for the base station, which may result in termination of regulation mode that was obtained from the base station. In another example, a client device that was previously unassociated (e.g., using default regulation mode) may have moved within the coverage area of a base station and may proceed to obtain a regulation mode and/or transmit power parameters from its associated base station.

Figure 5:
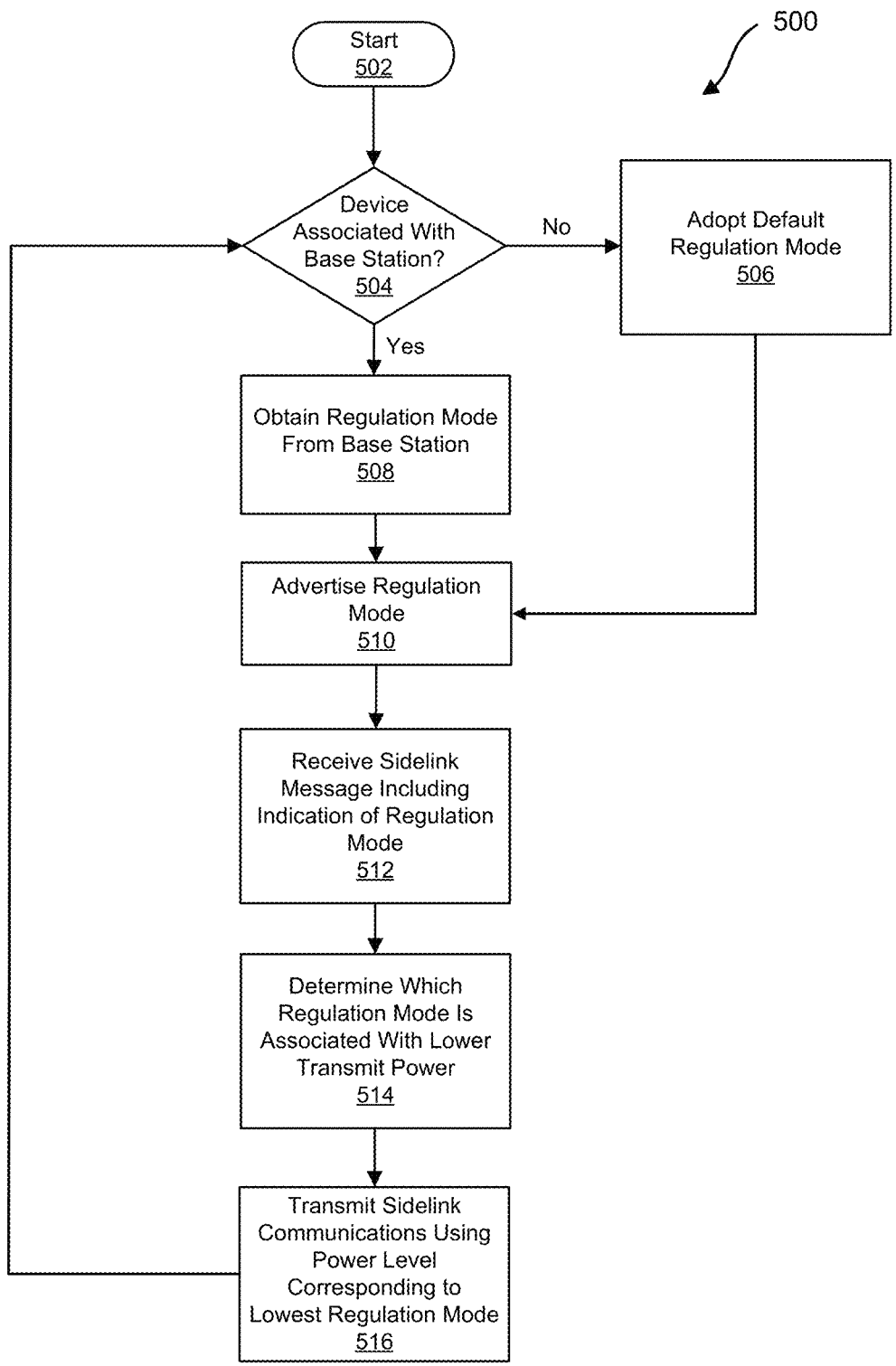
FIG. 5 is a flow diagram illustrating another example of a process for performing sidelink communications, in accordance with some examples.

FIG. 5 is a flow diagram illustrating an example of a process 500 for performing sidelink communications. The process 500 may begin at operation 502 which can include a client device booting up and/or initiating operations relating to sidelink communications. At operation 504, a client device may determine whether it is associated with a base station (e.g., base station 302). A client device may be associated with a base station when it is communicatively coupled to the base station and remains within a coverage area or zone for the base station.

At operation 504, a client device may determine that it is not associated with a base station and the process 500 can proceed to operation 506 in which the client device can obtain, adopt, and/or otherwise utilize a default regulation mode (e.g., Very Low Power (VLP) mode).

At operation 504, a client device may determine that it is associated with a base station, and the process 500 can proceed to operation 508 in which the client device obtains a regulation mode and/or transmit power parameter(s) from the base station. In one example, the client device may send a communication to the base station requesting a regulation mode. In another example, a base station may provide the regulation mode to the client device upon association and/or at periodic time intervals.

After a client determines its regulation mode (e.g., default regulation mode at operation 506 or base station regulation mode at operation 508), the process 500 can proceed to operation 510 in which a client advertises its regulation mode. In some examples, the transmission advertising a regulation mode associated with a client device can be done using a power level that is compatible with all regulation modes. For instance, the advertising message can be transmitted using a power level corresponding to VLP mode. In some aspects, the advertising message can be transmitted in Sidelink Control Information (SCI) or in Physical Sidelink Shared Channel (PSSCH).

In some cases, the advertising message can include an indication of the regulation mode and/or of one or more parameters associated with the regulation mode. For example, the advertising message can inform other client devices that the client device sending the advertising message is utilizing a maximum transmit power parameter of 30 dBm. In another example, the advertising message can inform other client devices that the client device sending the advertising message is utilizing an SP mode.

Client devices receiving the advertising message can determine whether the regulation mode and/or transmit power parameter(s) corresponds to a transmit power level that is higher or lower than the transmit power level associated with a regulation mode of the receiving client device. Based on the determination, client devices can respond to the advertising message with a sidelink transmission using a power level that corresponds to the lower of the two regulation modes. In some examples, client devices can respond to the advertising message with a sidelink transmission using a default power level (e.g., corresponding to VLP mode) that includes an indication of the regulation mode and/or transmit power parameter associated with the client device.

At operation 512, a client device can receive a sidelink message including an indication of a regulation mode and/or a transmit power parameter that is associated with the transmitting device. In some examples, the message received at operation 512 may be in response to the advertising message sent at operation 510. In other examples, the message received at operation 512 may correspond to an advertising message that is sent by a different client device. In some cases, the message received at operation 512 may have a power level corresponding to a VLP mode.

At operation 514, a client device may determine which regulation mode or transmit power parameter is associated with a lower transmit power level. For example, a client device may compare its own regulation mode with the regulation mode signaled in the message received at operation 512 to determine which of the two regulation modes is associated with a lower transmit power level (e.g., VLP mode is associated with a lower transmit power level than SP mode). In another aspect, a client device may compare its own maximum transmit power parameter with a maximum transmit power parameter that was included or otherwise signaled by the message received at operation 512 (e.g., maximum EIRP of 24 dBm is lower than maximum EIRP of 30vdBm).

At operation 516, a client device may transmit sidelink communications using a power level corresponding to the lowest regulation mode or the lowest transmit power parameter, as determined at operation 514. For example, a client device configured to operate using SP mode may transmit sidelink communications using a power level that is associated with LPI mode or VLP mode such that the operating modes of the corresponding client devices are aligned to use a power level that is permissible under each of the respective regulation modes.

After operation 516, the process 500 can return to operation 504 to continue to monitor for association between a client device and a base station. For example, a client device that was previously associated with a base station may have moved outside of the coverage area for the base station, which may result in termination of regulation mode that was obtained from the base station. In another example, a client device that was previously unassociated (e.g., using default regulation mode) may have moved within the coverage area of a base station and may proceed to obtain a regulation mode and/or transmit power parameters from its associated base station.

Figure 6:
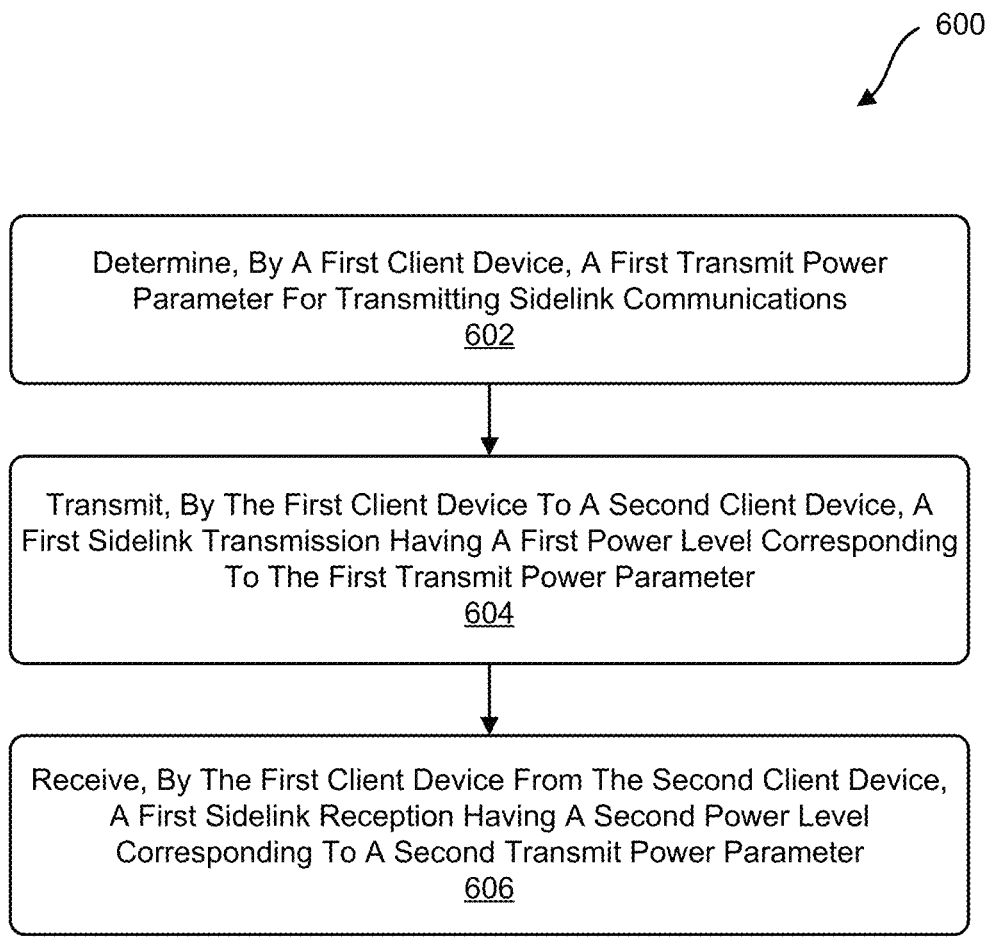
FIG. 6 is a flow diagram illustrating another example of a process for performing sidelink communications, in accordance with some examples.

FIG. 6 is a flow diagram illustrating an example of a process 600 for performing sidelink communications. At operation 602, the process 600 includes determining, by a first client device, a first transmit power parameter for transmitting sidelink communications. In some cases, the first transmit power parameter can correspond to a maximum transmit power (e.g., a maximum effective isotropic radiated power (EIRP) or a maximum power spectral density (PSD)). In some examples, the first transmit power parameter can be received from a base station that is associated with the first client device. In another example, the first transmit power parameter can correspond to a default transmit power parameter that is based on the first client device not being associated with a base station (e.g., VLP mode).

At operation 604, the process 600 includes transmitting, by the first client device to a second client device, a first sidelink transmission having a first power level corresponding to the first transmit power parameter. In some examples, the first transmit power level can be a level that is less than or equal to a power level associated with the first transmit power parameter. For instance, the first transmit power level may be 29 dBm and the first transmit power parameter may be 30 dBm. In some cases, the first client device can be configured to perform base station assisted sidelink communications, and the first transmit power parameter can be provided to the first client device based on an operating mode associated with the second client device. For example, the base station may determine that the second client device is configured to operate in LPI mode and may provide the first client device with a first transmit power parameter that is compatible with LPI mode.

At operation 606, the process 600 includes receiving, by the first client device from the second client device, a first sidelink reception having a second power level corresponding to a second transmit power parameter. In some examples, the second client device can be associated with the same base station as the first client device, and the first transmit power parameter can be equivalent to the second transmit power parameter. In other examples, the second client device can be associated with a different base station than the first client device, and the second client device can receive the second transmit power parameter from its associated base station. In some cases, the first transmit power parameter and the second transmit power parameter may be the same or different. The first transmit power parameter and the second transmit power parameter may correspond to power levels associated with Standard Power (SP) mode, Low Power Indoor (LPI) mode, Very Low Power (VLP) mode, or any other suitable mode.

In some examples, a client device may receive an uplink transmit power parameter from its associated base station. The uplink transmit power parameter can be used by the client device to determine the power level for transmitting uplink signals to the base station. In some instances, the uplink transmit power parameter may be different than the first transmit power parameter used for sidelink communications. In some aspects, the client device may transmit uplink transmissions having a power level that corresponds to the uplink transmit power parameter.

In some aspects, the first client device may move and establish an association with the second base station. Based on this association, the first client device may receive the second transmit power parameter from the second base station (e.g., same power parameter used by the second client device). The first client device may transmit, to the second client device, additional sidelink transmissions having the second power level that corresponds to the second transmit power parameter.

Figure 7:
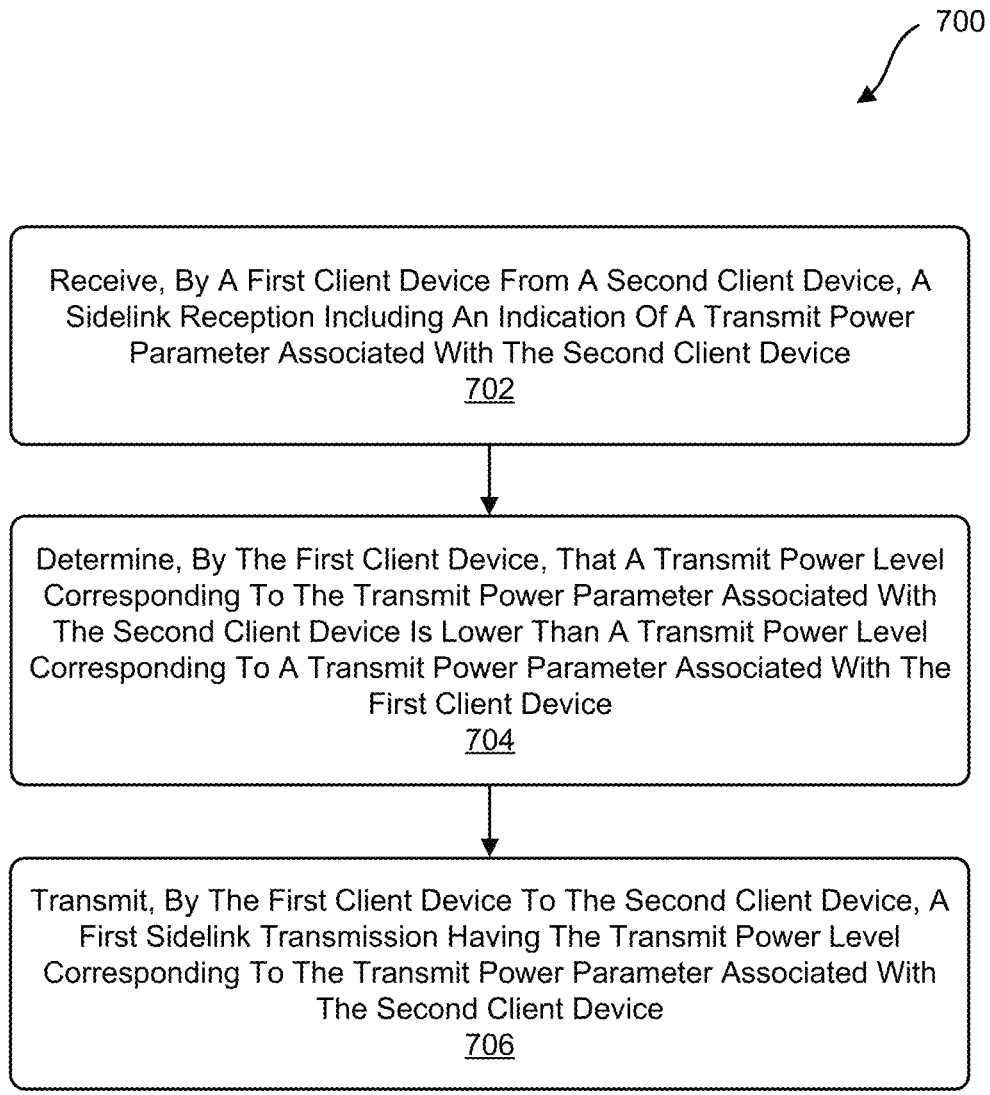
FIG. 7 is a flow diagram illustrating another example of a process for performing sidelink communications, in accordance with some examples.

FIG. 7 is a flow diagram illustrating an example of a process 700 for performing sidelink communications. At operation 702, the process includes receiving, by a first client device from a second client device, a sidelink reception including an indication of a transmit power parameter associated with the second client device. In some examples, the sidelink reception can correspond to an advertising message that is broadcast by the second client device in order to communicate the regulation mode and/or transmit power parameter that is associated with the second client device. In some cases, the sidelink reception can be sent using a power level corresponding to a VLP mode.

At operation 704, the process 700 includes determining, by the first client device, that a transmit power level corresponding to the transmit power parameter associated with the second client device is lower than a transmit power level corresponding to a transmit power parameter associated with the first client device. For example, the transmit power level corresponding to the transmit power parameter for the second device may correspond to LPI mode and the transmit power level corresponding to the transmit power parameter for the first device may correspond to SP mode. In some examples, the transmit power parameter associated with the first client device is obtained from a base station. In some aspects, the base station can provide a time duration associated with the transmit power parameter. In other aspects, the base station may signal the first client device to indicate that a time duration associated with the transmit power parameter has expired. In some examples, the transmit power parameter associated with the first client device can correspond to a default power parameter.

At operation 706, the process 700 includes transmitting, by the first client device to the second client device, a first sidelink transmission having the transmit power level corresponding to the transmit power parameter associated with the second client device. For example, the first client device may transmit the first sidelink transmission using a power level that corresponds to LPI mode while the first client device is in SP mode.

In some examples, the first client device may transmit a second sidelink transmission including the transmit power parameter associated with the first client device. In some cases, the second sidelink transmission may correspond to an advertising (e.g., broadcast) message that can be received by any client devices that are within range of the transmission. In some cases, the second sidelink transmission can be sent using a power level corresponding to a VLP mode.

In some aspects, the first client device may receive, from a plurality of client devices, a plurality of sidelink receptions in response to the second sidelink transmission. In some cases, each of the plurality of sidelink receptions can be associated with a corresponding plurality of transmit power parameters. Based on the plurality of transmit power parameters, the first client device can determine a lowest transmit power level and may use the lower transmit power level to transmit a sidelink group transmission to the plurality of client devices.

In some examples, the first client device can determine that the transmit power parameter used for performing sidelink communications with the second client device is different than a transmit power parameter used for communicating with a base station (e.g., uplink transmissions). In some cases, the first client device can transmit a signal that can be received by the base station as well as the second client device. For example, the signal can include a first portion of signal elements that are transmitted using the power level corresponding to the transmit power parameter for sidelink communications and a second portion of elements that are transmitted using a power level corresponding to the uplink transmit power parameter. In some instances, the signal can be a time-division multiplexed signal having signal elements corresponding to time slots. In further aspects, the signal can be a frequency-division multiplexed signal having signal elements corresponding to frequency sub-bands.

In some examples, the processes described herein (e.g., process 400, 500, 600, 700 and/or other process described herein) may be performed by a computing device or apparatus (e.g., a UE). In one example, the process 600 can be performed by the user device 207 of FIG. 2. In another example, the process 600 can be performed by a computing device with the computing system 800 shown in FIG. 8. For instance, a computing device with the computing architecture shown in FIG. 8 can include the components of the user device 207 of FIG. 2 and can implement the operations of FIG. 6.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
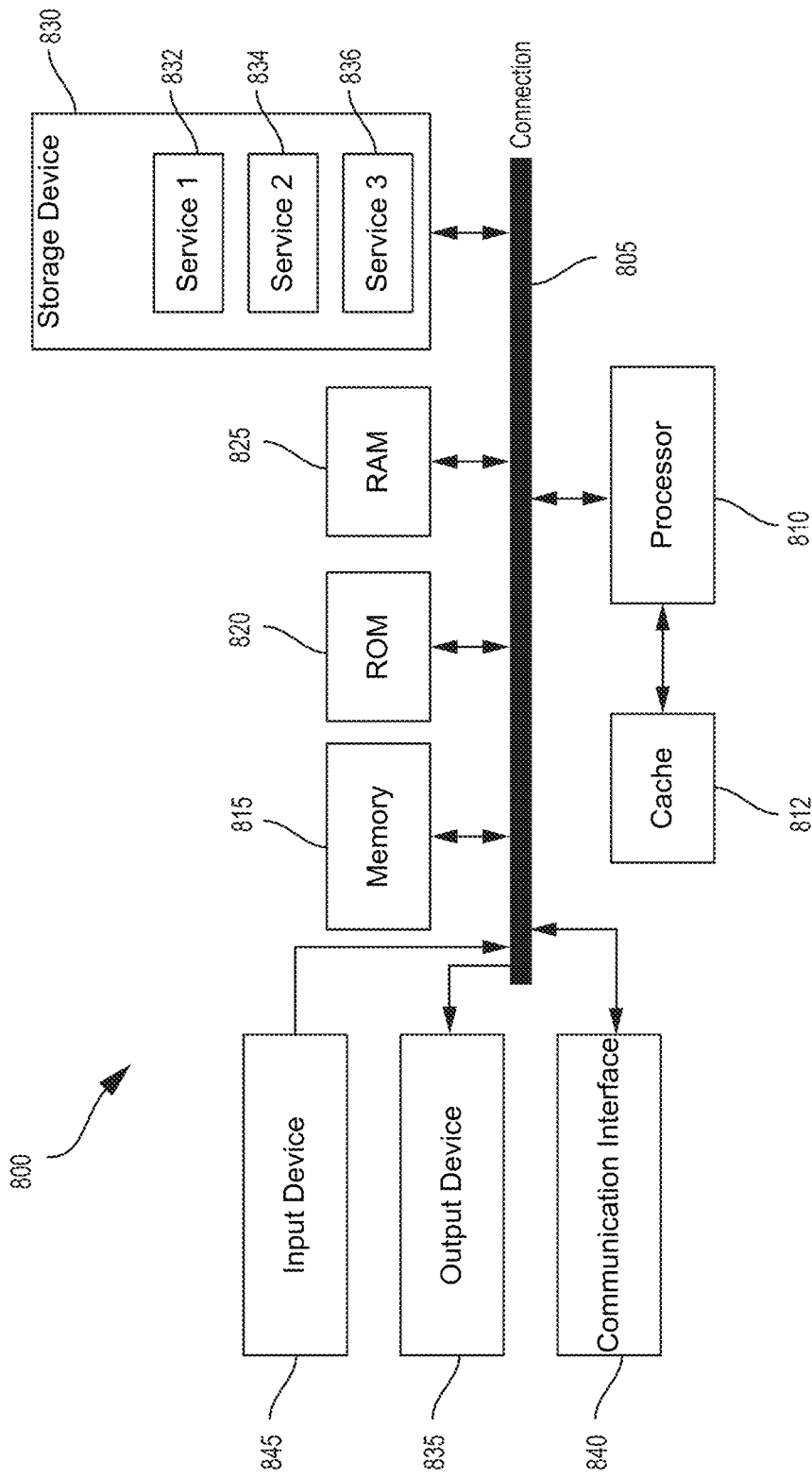
FIG. 8 is a block diagram illustrating an example of a computing system, in accordance with some examples.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that communicatively couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800.

Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1

(L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure.

A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus for performing sidelink communications. The apparatus includes at least one memory and at least one processor coupled to the at least one memory. The at least one processor is configured to: determine a first transmit power parameter for transmitting sidelink communications; transmit, to a client device, a first sidelink transmission having a first power level corresponding to the first transmit power parameter; and receive, from the client device, a first sidelink reception having a second power level corresponding to a second transmit power parameter.

Aspect 2: The apparatus according to aspect 1, wherein the first transmit power parameter is received from a first base station.

Aspect 3: The apparatus according to aspect 2, wherein the second client device is associated with the first base station, and the first transmit power parameter is equivalent to the second transmit power parameter.

Aspect 4: The apparatus according to any one of aspects 2 or 3, wherein the first base station is configured to perform base station assisted sidelink communications, and wherein the first base station provides the first transmit power parameter based on an operating mode associated with the second client device.

Aspect 5: The apparatus according to any one of aspects 2 to 4, wherein the at least one processor is configured to:

receive, from the first base station, an uplink transmit parameter different than the first transmit power parameter, and transmit, to the first base station, at least one uplink transmission having a transmit power level corresponding to the uplink transmit parameter.

Aspect 6: The apparatus according to any one of aspects 2 to 5, wherein the second client device is associated with a second base station and the second transmit power parameter is provided to the second client device by the second base station.

Aspect 7: The apparatus according to aspect 6, wherein the first transmit power parameter corresponds to a standard power (SP) mode and the second transmit power parameter corresponds to a low power indoor (LPI) mode.

Aspect 8: The apparatus according to any one of aspects 6 or 7, wherein the at least one processor is configured to: establish an association with the second base station; receive, from the second base station, the second transmit power parameter; and transmit, to the second client device, a second sidelink transmission having the second power level corresponding to the second transmit power parameter.

Aspect 9: The apparatus according to aspect 1, wherein the first transmit power parameter is a default power parameter based on not being associated with any base station.

Aspect 10: The apparatus according to aspect 9, wherein the default power parameter corresponds to a very low power (VLP) mode.

Aspect 11: A method of performing sidelink communications, the method including operations according to any of aspects 1 to 10.

Aspect 12: A computer-readable medium comprising at least one instruction for causing a computer or processor to perform operations according to any of aspects 1 to 10.

Aspect 13: An apparatus for performing sidelink communications, the apparatus including means for performing operations according to any of aspects 1 to 10.

Aspect 14: An apparatus for performing sidelink communications. The apparatus includes at least one memory and at least one processor coupled to the at least one memory. The at least one processor is configured to: receive, from a client device, a sidelink reception including an indication of a transmit power parameter associated with the client device; determine that a transmit power level corresponding to the transmit power parameter associated with the client device is lower than a transmit power level corresponding to a power parameter associated with the apparatus; and transmit, to the client device, a first sidelink transmission having the transmit power level corresponding to the transmit power parameter associated with the client device.

Aspect 15: The apparatus according to aspect 14, wherein the at least one processor is configured to: transmit a second sidelink transmission including the power parameter associated with the apparatus.

Aspect 16: The apparatus according to aspect 15, wherein the second sidelink transmission has a power level corresponding to a very low power (VLP) mode.

Aspect 17: The apparatus according to any one of aspects 15 or 16, wherein the at least one processor is configured to: receive, in response to the second sidelink transmission, a plurality of sidelink receptions from a plurality of client devices, wherein each of the plurality of sidelink receptions is associated with a plurality of transmit power parameters; determine a lowest transmit power level from the plurality of transmit power parameters; and transmit, to the plurality of client devices, a sidelink group transmission having the lowest transmit power level.

Aspect 18: The apparatus according to any one of aspects 15 to 17, wherein the second sidelink transmission is made using a frequency band that is authorized for a very low power (VLP) mode.

Aspect 19: The apparatus according to any one of aspects 14 to 18, wherein the power parameter associated with the apparatus is obtained from a base station.

Aspect 20: The apparatus according to aspect 19, wherein the at least one processor is configured to: obtain, from the base station, a time duration associated with the power parameter.

Aspect 21: The apparatus according to any one of aspects 14 to 20, wherein the at least one processor is configured to: determine that the transmit power level corresponding to the transmit power parameter associated with the client device is different than an uplink transmit power parameter for communicating with a base station; and transmit a signal with a first portion of signal elements having the transmit power level corresponding to the transmit power parameter associated with the client device and a second portion of signal elements having an uplink power level corresponding to the uplink transmit power parameter.

Aspect 22: The apparatus according to aspect 21, wherein the signal is a time-division multiplexed signal and the first portion and the second portion of signal elements correspond to time slots.

Aspect 23: The apparatus according to aspect 21, wherein the signal is a frequency-division multiplexed signal and the first portion and the second portion of signal elements correspond to frequency sub-bands.

Aspect 24: A method of performing sidelink communications, the method including operations according to any of aspects 14 to 23.

Aspect 25: A computer-readable medium comprising at least one instruction for causing a computer or processor to perform operations according to any of aspects 14 to 23.

Aspect 26: An apparatus for performing sidelink communications, the apparatus including means for performing operations according to any of aspects 14 to 23.

Aspect 27: A method of performing sidelink communications, the method including operations according to any of aspects 1 to 10 and any of aspects 14 to 23.

Aspect 28: A computer-readable medium comprising at least one instruction for causing a computer or processor to perform operations according to any of aspects 1 to 10 and any of aspects 14 to 23.

Aspect 29: An apparatus for performing sidelink communications, the apparatus including means for performing operations according to any of aspects 1 to 10 and any of aspects 14 to 23.

What is claimed is:

1. A method of performing sidelink communications, comprising:
   receiving, by a first client device from a second client device, a sidelink reception including an indication of a transmit power parameter associated with the second client device;
   determining, by the first client device, that a transmit power level corresponding to the transmit power parameter associated with the second client device is lower than a transmit power level corresponding to a transmit power parameter associated with the first client device; and
   transmitting, by the first client device to the second client device, a first sidelink transmission having the transmit power level corresponding to the transmit power parameter associated with the second client device.

2. The method of claim 1, further comprising:
transmitting a second sidelink transmission including the transmit power parameter associated with the first client device.

3. The method of claim 2, wherein the second sidelink transmission has a power level corresponding to a very low power (VLP) mode.

4. The method of claim 2, further comprising:
receiving, in response to the second sidelink transmission, a plurality of sidelink receptions from a plurality of client devices, wherein each of the plurality of sidelink receptions is associated with a plurality of transmit power parameters;
determining a lowest transmit power level from the plurality of transmit power parameters; and
transmitting, to the plurality of client devices, a sidelink group transmission having the lowest transmit power level.

5. The method of claim 2, wherein the second sidelink transmission is made using a frequency band that is authorized for a very low power (VLP) mode.

6. The method of claim 1, wherein the transmit power parameter associated with the first client device is obtained from a network device.

7. The method of claim 6, further comprising:
obtaining, from the network device, a time duration associated with the transmit power parameter.

8. The method of claim 1, further comprising:
determining that the transmit power level corresponding to the transmit power parameter associated with the second client device is different than an uplink transmit power parameter for communicating with a network device; and
transmitting a signal with a first portion of signal elements having the transmit power level corresponding to the transmit power parameter associated with the second client device and a second portion of signal elements having an uplink power level corresponding to the uplink transmit power parameter.

9. The method of claim 8, wherein the signal is a time-division multiplexed (TDM) signal and the first portion and the second portion of signal elements correspond to time slots.

10. The method of claim 8, wherein the signal is a frequency-division multiplexed (FDM) signal and the first portion and the second portion of signal elements correspond to frequency sub-bands.

11. An apparatus for performing sidelink communications, comprising:
at least one memory; and
at least one processor coupled to the at least one memory and configured to:
receive, from a client device, a sidelink reception including an indication of a transmit power parameter associated with the client device;
determine that a transmit power level corresponding to the transmit power parameter associated with the client device is lower than a transmit power level corresponding to a transmit power parameter associated with the apparatus; and
transmit, to the client device, a first sidelink transmission having the transmit power level corresponding to the transmit power parameter associated with the client device.

12. The apparatus of claim 11, wherein the at least one processor is configured to:
transmit a second sidelink transmission including the transmit power parameter associated with the apparatus.

13. The apparatus of claim 12, wherein the second sidelink transmission has a power level corresponding to a very low power (VLP) mode.

14. The apparatus of claim 12, wherein the at least one processor is configured to:
receive, in response to the second sidelink transmission, a plurality of sidelink receptions from a plurality of client devices, wherein each of the plurality of sidelink receptions is associated with a plurality of transmit power parameters;
determine a lowest transmit power level from the plurality of transmit power parameters; and
transmit, to the plurality of client devices, a sidelink group transmission having the lowest transmit power level.

15. The apparatus of claim 12, wherein the second sidelink transmission is made using a frequency band that is authorized for a very low power (VLP) mode.

16. The apparatus of claim 11, wherein the transmit power parameter associated with the apparatus is obtained from a network device associated with the apparatus.

17. The apparatus of claim 16, wherein the at least one processor is configured to:
obtain, from the network device, a time duration associated with the transmit power parameter.

18. The apparatus of claim 11, wherein the at least one processor is configured to:
determine that the transmit power level corresponding to the transmit power parameter associated with the client device is different than an uplink transmit power parameter for communicating with a network device; and
transmit a signal with a first portion of signal elements having the transmit power level corresponding to the transmit power parameter associated with the client device and a second portion of signal elements having an uplink power level corresponding to the uplink transmit power parameter.

19. The apparatus of claim 18, wherein the signal is a time-division multiplexed (TDM) signal and the first portion and the second portion of signal elements correspond to time slots.

20. The apparatus of claim 18, wherein the signal is a frequency-division multiplexed (FDM) signal and the first portion and the second portion of signal elements correspond to frequency sub-bands.

21. A non-transitory computer-readable medium of a first client device having stored thereon at least one instruction that, when executed by one or more processors, cause the one or more processors to:
receive, from a client device, a sidelink reception including an indication of a transmit power parameter associated with the client device;
determine that a transmit power level corresponding to the transmit power parameter associated with the client device is lower than a transmit power level corresponding to a transmit power parameter associated with the first client device; and
transmit, to the client device, a first sidelink transmission having the transmit power level corresponding to the transmit power parameter associated with the client device.

22. The non-transitory computer-readable medium of claim 21, wherein the at least one instruction, when executed by the one or more processors, cause the one or more processors to:
    transmit a second sidelink transmission including the transmit power parameter associated with the first client device.

23. The non-transitory computer-readable medium of claim 22, wherein the second sidelink transmission has a power level corresponding to a very low power (VLP) mode.

24. The non-transitory computer-readable medium of claim 22, wherein the at least one instruction, when executed by the one or more processors, cause the one or more processors to:
    receive, in response to the second sidelink transmission, a plurality of sidelink receptions from a plurality of client devices, wherein each of the plurality of sidelink receptions is associated with a plurality of transmit power parameters;
    determine a lowest transmit power level from the plurality of transmit power parameters; and
    transmit, to the plurality of client devices, a sidelink group transmission having the lowest transmit power level.

25. The non-transitory computer-readable medium of claim 22, wherein the second sidelink transmission is made using a frequency band that is authorized for a very low power (VLP) mode.

26. The non-transitory computer-readable medium of claim 21, wherein the transmit power parameter associated with the first client device is obtained from a network device associated with the first client device.

27. The non-transitory computer-readable medium of claim 26, wherein the at least one instruction, when executed by the one or more processors, cause the one or more processors to:
    obtain, from the network device, a time duration associated with the transmit power parameter.

28. The non-transitory computer-readable medium of claim 21, wherein the at least one instruction, when executed by the one or more processors, cause the one or more processors to:
    determine that the transmit power level corresponding to the transmit power parameter associated with the client device is different than an uplink transmit power parameter for communicating with a network device; and
    transmit a signal with a first portion of signal elements having the transmit power level corresponding to the transmit power parameter associated with the client device and a second portion of signal elements having an uplink power level corresponding to the uplink transmit power parameter.

29. The non-transitory computer-readable medium of claim 28, wherein the signal is a time-division multiplexed (TDM) signal and the first portion and the second portion of signal elements correspond to time slots.

30. The non-transitory computer-readable medium of claim 28, wherein the signal is a frequency-division multiplexed (FDM) signal and the first portion and the second portion of signal elements correspond to frequency sub-bands.

* * * * *